June 2, 1942.  P. B. PARKS  2,284,764
TEMPERATURE CONTROLLED APPARATUS
Filed March 16, 1939
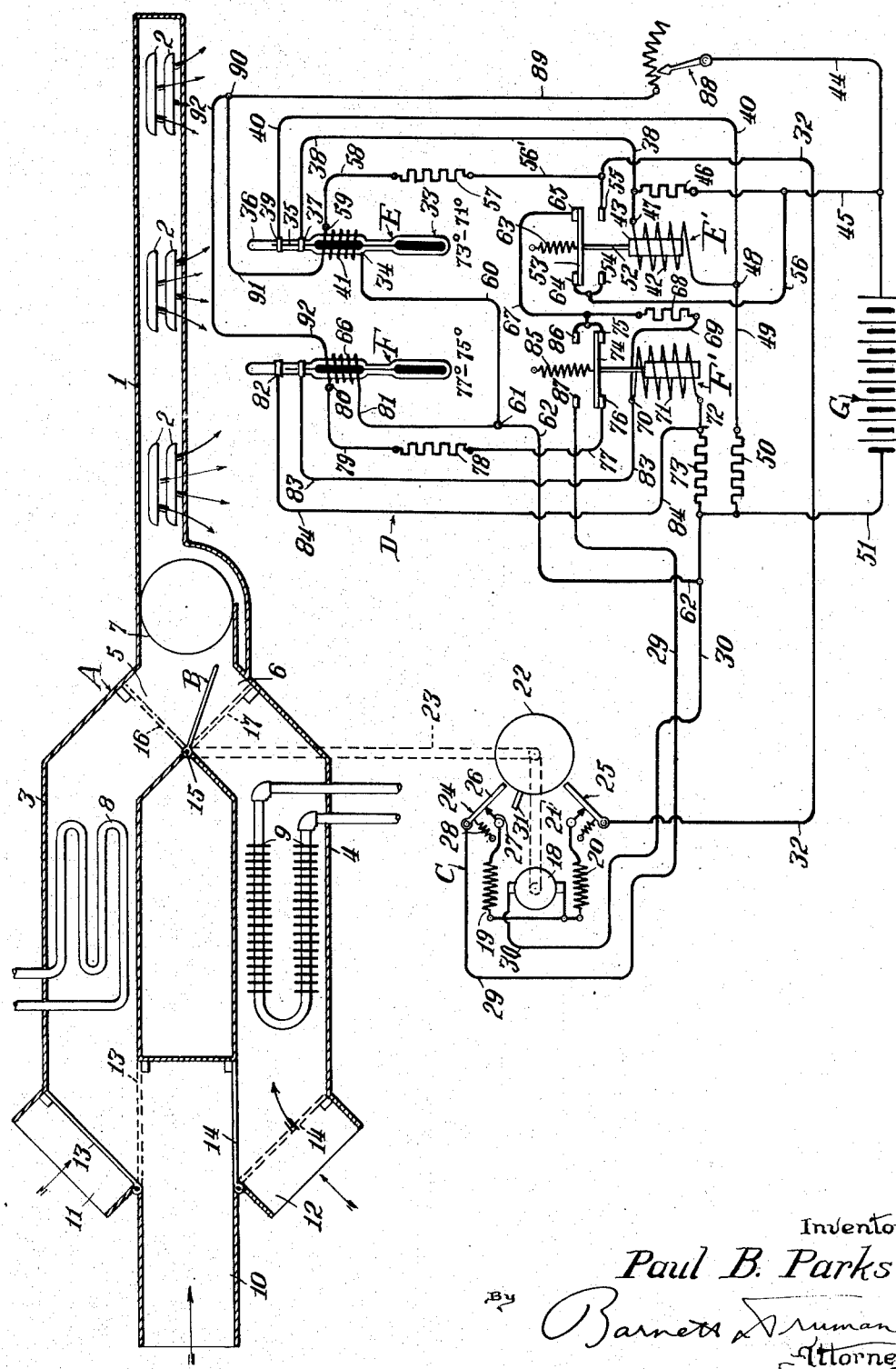
Inventor
Paul B. Parks
By Barnett & Truman
Attorneys Patented June 2, 1942

2,284,764

UNITED STATES PATENT OFFICE 2,284,764

TEMPERATURE CONTROLLED APPARATUS

Paul B. Parks, Oak Park, Ill., assignor to Vapor Car Heating Company, Inc., Chicago, Ill., a corporation of New York Application March 16, 1939, Serial No. 262,191

8 Claims. (Cl. 236—1)

This invention relates to a new and improved temperature controlled apparatus, and more particularly to a thermostatically actuated mechanism responsive to temperature variations in a space either above a predetermined maximum temperature or below a predetermined minimum temperature for causing successive adjustments of a control member with the ultimate object of bringing the space temperature back between the predetermined maximum and minimum limits. The space temperature may fluctuate within the temperature range or zone between these established limits without causing any functioning of the control or adjusting mechanism.

More specifically the mechanism comprises a pair of cooperating but separately acting thermostatic assemblies, each assembly comprising a thermostat of the "cycling" type and cooperating relay and control circuits. One of these thermostatic assemblies functions only when the space temperature has fallen below a predetermined minimum, and acts to move the main control member step-by-step or by successive impulses in one direction only, the magnitude and/or frequency of these impulses diminishing as the space temperature rises toward the predetermined minimum, and the adjustments ceasing entirely when the space temperature has again passed into the permitted temperature zone between the maximum and minimum limits. On the other hand, the other thermostatic assembly functions only when the space temperature has risen above the predetermined maximum and acts to successively adjust the main control member only in the opposite direction, the adjustments diminishing as the space temperature is reduced toward the selected maximum limit. Neither thermostat has any controlling effect as long as the space temperature remains within the selected limits. As a result "over-shooting" or "hunting" is minimized and when the main movable control member has once been satisfactorily positioned only small and infrequent adjustments are necessary in order to maintain the space temperature within the desired range.

The principal object of this invention is to provide a controlling apparatus of the type briefly described hereinabove and disclosed more in detail in the specifications which follow.

Another object is to provide an improved thermostatically controlled adjusting mechanism effective only beyond the predetermined upper and lower limits of a selected temperature range.

Another object is to provide electrically actuated control means for selecting both the upper and lower actuating temperatures of a thermostat of the "cycling" type.

Another object is to provide an improved temperature regulating mechanism in which a tempered air stream is forced into a space, a selected portion of this air stream being either heated or cooled in accordance with the season so that the mechanism can function as a heating means in the winter and a cooling means in the summer.

Other objects and advantages of this invention will be more apparent from the following detailed description of one approved form of mechanism constructed and operating according to the principles of this invention.

The accompanying drawing is a wiring diagram of the automatic control assembly, also diagrammaticallly showing the essential features of the temperature regulating mechanism.

Referring now to the drawing, at A is indicated generally a heat-exchange or temperature regulating mechanism comprising the movable control member B. Adjustment of the member B determines the temperature of an air stream delivered into the space, the temperature of which is to be regulated. At C is indicated a reversible motor mechanism for adjustably positioning the member B, and at D is indicated generally the thermostatic control mechanism for determining the operation of motor mechanism C and hence the positioning of control member B. The control mechanism D comprises two similar thermostatically controlled assemblies. One of these assemblies comprises the thermostat E and associated relay E' with the cooperating circuits and switches and functions only when the temperature within the space falls below a certain predetermined minimum. The other similar thermostatic assembly, comprising the thermostat F and relay F' functions only when the temperature within the space rises above a certain predetermined maximum. At G is shown the source of electric power herein indicated as a battery.

The temperature regulating mechanism A, in the example here shown, comprises a main air supply conduit 1 from which a stream of tempered air is discharged into the space through a series of suitably positioned outlets 2. A pair of similar branch conduits 3 and 4 discharge at 5 and 6, respectively, into the main conduit 1, the respective air streams being drawn through conduits 3 and 4 and discharged into conduit 1 by means of a suitable blower 7.

A suitable cooling mechanism, indicated by the coil 8, is positioned in conduit 3, and a suitable heater, indicated by the radiator 9, is positioned in the other branch conduit 4. Usually only one of these heat-exchangers 8 and 9 will be utilized at any one time, the heater 9 functioning in the winter months, or when the outside air temperature is lower than the temperature to be maintained in the space into which the air stream is discharged, and the cooler 8 being used in the summer months when the outside temperature is higher than the temperature to be maintained in the space. Outside air is drawn in through the inlet conduit 10 whereas air returned from the enclosed space is drawn in through inlet conduits 11 and 12. The discharge outlets of conduits 10, 11 and 12 are controlled by a pair of similar pivoted dampers 13 and 14. In the heating season the valves or dampers 13 and 14 are moved to the positions indicated in solid lines in the drawing. The return conduit 11 is now cut off by the damper 13 and the cool outside air from inlet conduit 10 is drawn into and through the branch conduit 3. Air returned from the enclosed space is drawn in through inlet conduit 12 through branch conduit 4 in which the active heater 9 is positioned. In the summer, or the cooling season, the valves or dampers 13 and 14 are moved to the dotted line positions. The outside warmer air is now drawn in through branch conduit 4, whereas the returned air from the space is drawn through branch conduit 3 and heat is removed therefrom by the active cooler 8. The parts are shown in the drawing as positioned for winter operation.

The main movable control member B is here shown as a valve or damper pivoted at one end 15. When damper B is moved to one extreme position, as indicated in dotted lines at 16, the inflow of cooler outside air through branch conduit 3 is entirely cut off and only heated air from conduit 4 is drawn into and through main conduit 1 and discharged into the space. On the other hand, if damper B is moved to the other extreme position indicated in dotted lines at 17, the inflow of heated air is entirely cut off and only outside air is drawn through branch conduit 3 and discharged through the main conduit 1 into the space. Ordinarily the control damper B will be in some intermediate position, such as indicated in solid lines in the drawing. As here shown, the main air stream delivered to the space consists of a relatively large proportion of outside unheated air delivered through branch conduit 3 and relatively unrestricted discharge outlet 5 thereof, and a relatively small proportion of heated air from branch conduit 4 delivered through the relatively small restricted outlet 6. Obviously, as the outside temperature falls, the controlling damper B must be moved in a counterclockwise direction so as to increase the proportion of heated air and restrict the inflow of cold outside air.

The electric motor mechanism C, in the example here shown, comprises a reversible armature 18, and a pair of alternative fields 19 and 20. The rotation of armature 18 is adapted, through suitable reduction gearing, indicated at 21, 22 and 23, to move the control member B in one direction or the other according to the direction of rotation of the motor. At 24 and 25 are indicated a pair of similar limit switches, one in each of the alternative motor-energizing circuits. Each of these switches comprises a movable switch member 26 normally held against a fixed contact 27 by spring 28. When controlling damper B is to be moved in a clockwise direction, a motor-energizing circuit is completed from wire 29 through limit switch 24, field 19, armature 18, and out through wire 30. If this circuit should remain closed until damper B reaches its extreme position 17, a stop member 31 on the rotary member 22 of the chain of gearing will engage switch member 26 and break the circuit between the contacts 26 and 27. In a similar manner if an energizing circuit is completed from wire 32 through limit switch 25, field 20, armature 18 and wire 30, the damper B will be moved in a counter-clockwise direction and if this movement is not interrupted before it reaches the dotted line position 16, the stop member 31 will open the limit switch 25. Ordinarily the limit switches 24 and 25 will remain closed but the motor-energizing circuits will be intermittently completed and broken by the thermostatic control mechanism, indicated generally at D.

The thermostat E is here shown as of the mercury-column or thermometer type and comprises a pair of connected bulbs 33 and 34 from which the mercury-column 35 extends up through stem 36. An electrical contact 37 from which wire 38 extends is positioned in stem 36 so as to always be engaged by mercury column 35. A second contact 39, from which wire 40 extends, is positioned at a higher location in stem 36 so as to be engaged by the mercury column 35 and complete a circuit between wires 38 and 40 at some predetermined temperature for which the instrument is designed, for example 73°. The bulb 33 is completely exposed to the air within the space so as to respond directly to space temperature, but an auxiliary electric heater, here shown as a resistance coil 41, surrounds or is closely associated with bulb 34. When a predetermined electric current, for example enough to raise the temperature of the bulb two degrees, is passed through coil 41, the thermostat E will function at a lower space temperature, for example 71°.

The relay E' comprises the solenoid coil 42 surrounding the movable core 43. This solenoid is normally energized through the following circuit: From battery G through wires 44 and 45, resistance 46, terminal 47, coil 42, terminal 48, wire 49, resistance 50 and wire 51 back to the battery. When so energized, the core 43 will be drawn down so that stem 52 will move contact 53 into bridging engagement with the two fixed contacts 54 and 55. This positioning of the relay switch will complete a motor-energizing circuit as follows: From battery G through wires 44, 45 and 56, switch contacts 54, 53 and 55, wire 32 and thence through motor C, as already described, and wires 30 and 51 back to the battery. The motor mechanism will now move damper B in a counter-clockwise direction so as to increase the proportion of heated air supplied to the space. At the same time another circuit energizing the electric heater 41 will be completed as follows: As before, to relay contact 55, wire 56', resistance 57, wire 58, terminal 59, heater coil 41, wire 60, terminal 61 and wires 62, 30 and 51, back to the battery. If the space temperature is above 71° the added heat from auxiliary heater 41 will be sufficient to move the mercury column 35 up into engagement with contact 39, thus completing a shunt circuit, de-energizing relay E' as follows: From relay terminal 47 through wire 38, thermostat E and wire 40 back to the other relay terminal 48. Spring 63 will now draw the movable contact 53 up into engagement with a second pair of fixed contacts 64 and 65. This will break both the motor-energizing circuit and the heater energizing circuit previously described, so that the adjustment of damper B will stop and the heater 41 will cease to function. If the space temperature is still below 73°, the mercury-column 35 will again fall so as to break the connection at thermostat contact 39, whereupon the relay E' will again be energized and will pull down the movable contact 53 so as to start another adjusting movement of damper B (still in the same direction) and again energize the heater 41.

It will now be noted that the thermostatic assembly so far described is only capable of adjusting the control member B in one direction, that is in a direction to add to the heat supplied to the space. If the temperature within the space should remain at some temperature below 71° (for example 69°) the mercury column 35 will never make contact with upper contact 39 so as to de-energize the relay E', since the heat added by the continuously operating auxiliary heater 41 will be insufficient to raise the temperature applied to the thermostat to the equivalent of 73° at which it functions. As a consequence, the previously described motor-energizing circuit will remain continuously closed and the damper B will be continuously adjusted until it reaches its extreme position 16, whereupon the motor-energizing circuit will be broken by the automatic opening of limit switch 25. Only heated air from branch conduit 4 will now be supplied to the space.

On the other hand, assuming that the space temperature remains at some temperature above 73° (for example, 74°) the mercury-column will always remain in engagement with contact 39 and relay E' will be continuously de-energized. Even though the auxiliary heater 41 is inoperative at this time, the thermostat contacts will remain closed since the thermostat functions at 73° without any additional heat. It will now be seen that the thermostatic assembly just described is only capable of adjusting the control member B in one direction, that is to increase the heat supply, and as long as the space temperature is above 73°, it is incapable of causing any adjustment of the control member whatever.

The other thermostat F is in all respects similar to the thermostat E except that it is designed to function at a higher predetermined temperature, for example 77°, and when additional heat is added by the auxiliary heater 66, it will function at a somewhat lower temperature, for example 75°. The cooperating relay F' will normally be energized (but only while the space temperature is above 73°) through the following circuit: From battery G through wires 44, 45 and 56, contacts 64, 53 and 65 of relay E', wire 67, resistance 68, wire 69, relay terminal 70, solenoid coil 71, terminal 72, resistance 73 and wire 51, back to the battery. This will draw relay contact 74 down into engagement with fixed contacts 75 and 76 and complete a circuit energizing the auxiliary heater 66 as follows: From wire 67 through relay contacts 75, 74 and 76, wire 77, resistance 78, wire 79, terminal 80, heater 66, wire 81, terminal 61 and wires 62, 30 and 51, back to the battery.

Assuming first that the space temperature is somewhere between 73° and 75° (for example, 74°) the additional 2° of heat added by heater 66 will be insufficient to bring thermostat F up to the 77° temperature at which it functions, that is, the mercury column will not engage the upper contact 82. Under these circumstances no movement of motor C or adjustment of damper B can take place. All of the parts will remain in the relative positions indicated in the drawing. However, assuming that the space temperature rises to 76°, the added heat from auxiliary heater 66 will cause the thermostat F to register 78° and since the thermostat functions at 77°, the mercury column will engage upper contact 82 and complete a circuit for de-energizing relay F' as follows: From one relay terminal 70 through wire 83, thermostat F, and wire 84, back to the other relay terminal 72. Spring 85 will now draw up the movable relay contact 74 into engagement with a second pair of fixed contacts 86 and 87. This will break the previously described circuit for heater 66 and at the same time will complete a motor-energizing circuit as follows: From wire 67, through relay contacts 86, 74 and 87, wire 29, through limit switch 24, field 19 and armature 18, and wires 30 and 51, back to the battery. As a consequence the motor will be rotated in a reverse direction and will adjust control member B in a clockwise direction so as to cut down the supply of heat.

Since the space temperature was assumed to be 76° and thermostat F functions at 77° and no heat is now being applied by auxiliary heater 66, the mercury column will fall, breaking the shunt circuit at upper contact 82, and relay F' will again be energized to draw down the movable contact 74 and break the motor-energizing circuit just described. As long as the space temperature remains somewhere between 75° and 77° this cycle of events will repeat themselves, that is the thermostat will "cycle" and a series of short intermittent adjustments will be applied to the member B, all in a clockwise direction, until the space temperature has been lowered below 75°, after which this cycling will stop and this second thermostatic assembly will be inoperative. It will now be apparent that this second thermostatic assembly is only capable of adjusting the controller B in one direction (the opposite direction to that in which it is moved by the first described thermostatic assembly) and that when the space temperature has been moved into the normal zone between 73° and 75° no automatic adjustment whatever can take place. If, for any reason, the space temperature should rise and remain above 77°, the shunt circuit de-energizing relay F' will remain permanently closed and consequently the last described motor-energizing circuit will remain closed until controller B has entirely cut off the flow of heated air and limit switch 24 has been opened.

Under normal operating conditions the space temperature will never be permitted to depart very far from the normal permissible temperature range or zone between 73° and 75°, and while the temperature remains within this zone, no adjustments whatever are made. The entire operating mechanism remains in substantially the positions indicated in the drawing. Assuming that the space temperature drops slightly below 73°, thermostat E will function by breaking the circuit between mercury column 35 and contact 39 and relay E' will be energized. This will complete a motor-energizing circuit for adjusting controller B in a counter-clockwise direction, but the auxiliary heater 41 will be simultaneously energized so as to apply additional heat to thermostat E and the mercury-column will again be moved up to almost immediately close the shunt circuit which de-energizes the relay. As a consequence only a short or momentary impulse is applied by the motor mechanism to give the controller B a very small adjustment. If this adjustment is insufficient to again boost the space temperature above 73°, this cycle will repeat itself until sufficient adjustment has been made. The further the space temperature departs from the permitted temperature zone, the greater the magnitude and/or frequency of the adjustments, that is, if the space temperature is only slightly above 71°, the adjustment will be almost continuous, the adjustment becoming continuous if the space temperature falls below 71°. On the other hand, as the space temperature rises toward 73°, the adjustments diminish progressively and cease entirely as the space temperature enters the normal range between 73° and 75°. In this way, no excessive heat increase is made as the temperature rises into the normal operating zone, and over-shooting or hunting is avoided. The adjustments are similar in the range above 75°, and are performed by the other thermostatic assembly comprising thermostat F and relay F'. As the space temperature is lowered toward the normal operating range or zone, the adjustments are gradually diminished.

In order that the same control system can be used for controlling a cooling or refrigerating system in the summer, it is desirable that the thermostats be adjustable since a higher operating range of temperatures is usual during the cooling season. The thermostats E and F have heretofore been described as normally functioning at 73° and 77°, respectively. Preferably the thermostat E will be so designed as to have a much longer operating range, for example, it may function at 80° when no auxiliary heat is applied, but sufficient heat may be applied through auxiliary heater 41 to lower the operating temperature to, for example 65°. The thermostat F will be similarly designed, although its range of temperatures will be stepped up, as before, somewhat higher, for example there may be a constant differential of 4° between the functioning temperatures of the two thermostats. An adjusting current flows from battery G through wire 44, rheostat 88, wire 89, terminal 90, wire 91, terminal 59, heater 41, wire 60, terminal 61, and wires 62, 30 and 51, back to the battery. Another branch of this circuit extends from terminal 90 through wire 92, terminal 80, the other heater 66, and wire 81 to terminal 61. By suitably adjusting the rheostat 88 these currents which normally flow continuously through the two heaters 41 and 66 will be simultaneously and similarly adjusted so that the normal functioning temperatures of the thermostat may be predetermined and set at some selected points, for example 73° and 77°, as in the example hereinabove described in detail. When the additional heater circuits are intermittently closed by the relays as hereinabove described, this heating current will be slightly increased so as to cause the thermostats to function 2° lower, for example, at 71° and 75°. It will be understood that in the summer or cooling season these continuous currents through the heaters 41 and 66 will be considerably decreased so as to elevate the functioning temperatures of the two thermostats. However, no matter what adjustment is made by rheostat 88, the differential between the operating temperatures of the two thermostats will remain constant.

It will be understood that the temperatures hereinabove noted are given by way of example. The normal operating or cycling range of each thermostat might be made greater or less than 2° as here described. Also the normal temperature zone or range in which no adjustments are made may be increased or decreased, the range between 73° and 75° being merely an example.

It will be understood that other forms of temperature-regulating means could be used for raising or lowering the temperature within the space. The means here shown for tempering an air stream is merely one preferred form. The movable controller B could be used for regulating the speed of an engine or compressor, or any other means by which a change in space temperature is ultimately obtained.

I claim:

1. In a temperature controlled mechanism, a control member movable to raise or lower the temperature in a space, and means for moving said member alternatively in opposite directions comprising a pair of similar thermostatic assemblies, one comprising a thermostat operable in the temperature range below the predetermined minimum temperature in a space and means controlled by said thermostat operating to adjust the movable member only in a direction to increase the space temperature, and the other comprising a thermostat operable in the temperature range above a predetermined maximum temperature in the space and means controlled by said second thermostat operating to adjust the movable member only in the opposite direction to decrease the space temperature, neither thermostatic assembly being effective to adjust the movable member while the temperature within the space is between the said predetermined minimum and maximum, each thermostatic assembly causing the member to be adjusted by spaced impulses, the impulses being progressively diminished as the space temperature approaches the adjacent maximum or minimum temperature, the first mentioned thermostat being adapted to break a control circuit when the space temperature falls below the predetermined minimum, an auxiliary electric heater adjacent the thermostat functioning when energized to cause the thermostat to close the control circuit providing the space temperature is above a predetermined lower temperature, and means for causing the electric heater to be energized only while the control circuit is broken, the second mentioned similar thermostatic assembly functioning to close its control circuit when the space temperature rises above the predetermined maximum temperature and its auxiliary electric heater is energized and to close its control circuit at a predetermined higher temperature even though its heater is deenergized, and means for energizing the heater when the control circuit is broken.

2. In a temperature controlled mechanism, a control member movable to raise or lower the temperature in a space, and means for moving said member alternatively in opposite directions comprising a pair of similar thermostatic assemblies, one comprising a thermostat operable in the temperature range below the predetermined minimum temperature in a space and means controlled by said thermostat operating to adjust the movable member only in a direction to increase the space temperature, and the other comprising a thermostat operable in the temperature range above a predetermined maximum temperature in the space and means controlled by said second thermostat operating to adjust the movable member only in the opposite direction to decrease the space temperature, neither thermostatic assembly being effective to adjust the movable member while the temperature within the space is between the said predetermined minimum and maximum, each thermostatic assembly causing the member to be adjusted by spaced impulses, the impulses being progressively diminished as the space temperature approaches the adjacent maximum or minimum temperature, the first mentioned thermostat being adapted to break a control circuit when the space temperature falls below the predetermined minimum, an auxiliary electric heater adjacent the thermostat functioning when energized to cause the thermostat to close the control circuit providing the space temperature is above a predetermined lower temperature, and means for causing the electric heater to be energized only while the control circuit is broken, the second mentioned similar thermostatic assembly functioning to close its control circuit when the space temperature rises above the predetermined maximum temperature and its auxiliary electric heater is energized and to close its control circuit at a predetermined higher temperature even though its heater is deenergized and means for energizing the heater when the control circuit is broken, and means for simultaneously and continuously passing an adjustable current through both electric heaters to select the maximum and minimum temperatures without changing the spacing between said temperatures.

3. The combination with a member movable in opposite directions for respectively increasing or decreasing the rate of heat transfer to or from a space, of means for moving said member comprising a reversible motor mechanism, a pair of similar thermostatic assemblies, one comprising a thermostat operable in the temperature range below a predetermined minimum space temperature and means controlled by said thermostat to cause the motor mechanism to adjust the movable member only in a direction to raise the temperature within the space, and the other comprising a thermostat operable in the temperature range above a predetermined maximum space temperature and means controlled by said second thermostat to adjust the movable member only in a direction to decrease the space temperature, neither thermostatic assembly being effective to adjust the movable member while the space temperature is within the normal zone between the predetermined minimum and maximum temperatures, the first mentioned thermostat being adapted to break a control circuit when the space temperature falls below the predetermined minimum, an auxiliary electric heater adjacent the thermostat functioning when energized to cause the thermostat to close the control circuit providing the space temperature is above a predetermined lower temperature, and means for causing the electric heater to be energized only while the control circuit is broken, the second mentioned similar thermostatic assembly functioning to close its control circuit when the space temperature rises above the predetermined maximum temperature and its auxiliary electric heater is energized and to close its control circuit at a predetermined higher temperature even though its heater is deenergized, and means for energizing the heater when the control circuit is broken.

4. The combination with a member movable in opposite directions for respectively increasing or decreasing the rate of heat transfer to or from a space, of means for moving said member comprising a reversible motor mechanism, a pair of similar thermostatic assemblies, one comprising a thermostat operable in the temperature range below a predetermined minimum space temperature and means controlled by said thermostat to cause the motor mechanism to adjust the movable member only in a direction to raise the temperature within the space, and the other comprising a thermostat operable in the temperature range above a predetermined maximum space temperature and means controlled by said second thermostat to adjust the movable member only in a direction to decrease the space temperature, neither thermostatic assembly being effective to adjust the movable member while the space temperature is within the normal zone between the predetermined minimum and maximum temperatures, the first mentioned thermostat being adapted to break a control circuit when the space temperature falls below the predetermined minimum, an auxiliary electric heater adjacent the thermostat functioning when energized to cause the thermostat to close the control circuit providing the space temperature is above a predetermined lower temperature, and means for causing the electric heater to be energized only while the control circuit is broken, the second mentioned similar thermostatic assembly functioning to close its control circuit when the space temperature rises above the predetermined maximum temperature and its auxiliary electric heater is energized and to close its control circuit at a predetermined higher temperature even though its heater is deenergized, and means for energizing the heater when the control circuit is broken, and means for simultaneously and continuously passing an adjustable current through both electric heaters to select the maximum and minimum temperatures without changing the spacing between said temperatures.

5. The combination with a member movable in opposite directions for respectively increasing or decreasing the rate of heat transfer to or from a space, of means for moving said member comprising a reversible motor mechanism, an energizing circuit for causing operation of the motor mechanism in one direction, a second energizing circuit for causing operation of the motor mechanism in the other direction, a pair of control assemblies each comprising a thermostat, an auxiliary electric heater for the thermostat, a relay, a relay-control circuit that is made and broken by the thermostat, and a heater-energizing circuit that is made and broken by the relay, each relay also functioning to open and close one of the motor energizing circuits, one of the control assemblies functioning only in the temperature range below a predetermined minimum space temperature to adjust the movable member only in a direction to raise the temperature within the space, and the other control assembly functioning only in the range above a predetermined maximum space temperature to adjust the movable member only to decrease the space temperature, the assemblies being ineffective to adjust the movable member while the space temperature is within the normal zone between the predetermined maximum and minimum temperatures.

6. The combination with a member movable in opposite directions for respectively increasing or decreasing the rate of heat transfer to or from a space, of means for moving said member comprising a reversible motor mechanism, an energizing circuit for causing operation of the motor mechanism in one direction, a second energizing circuit for causing operation of the motor mechanism in the other direction, a pair of control assemblies each comprising a thermostat, an auxiliary electric heater for the thermostat, a relay, a relay-control circuit that is made and broken by the thermostat, and a heater-energizing circuit that is made and broken by the relay, each relay also functioning to open and close one of the motor energizing circuits, one of the control assemblies functioning only in the temperature range below a predetermined minimum space temperature to adjust the movable member only in a direction to raise the temperature within the space, and the other control assembly functioning only in the range above a predetermined maximum space temperature to adjust the movable member only to decrease the space temperature, the assemblies being ineffective to adjust the movable member while the space temperature is within the normal zone between the predetermined maximum and minimum temperatures, and means for simultaneously and continuously passing an adjustable current through both auxiliary electric heaters to select the maximum and minimum temperatures without changing the width of the normal space temperature zone.

7. In a temperature controlled system, means for controlling the heat-transfer to or from the space comprising a thermostat adapted to close a control circuit at a predetermined temperature within the space where the thermostat is positioned, a second similar thermostat within the space adapted to close a second control circuit at a second higher predetermined space temperature, a pair of auxiliary electric heaters, one associated with each thermostat, to apply additional heat thereto and cause the respective thermostat to function at a lower space temperature, an energizing circuit for continuously and simultaneously passing a current of adjustable magnitude through both heaters to predetermine the space temperatures at which the respective thermostats will function without changing the differential between these temperatures, and separate means for each heater for additionally increasing the current through that heater only at such times as the respective control circuit is broken at the thermostat to temporarily select a still lower space temperature at which that thermostat functions.

8. In apparatus for regulating the temperature within a space, a main conduit for delivering an air stream into the space, means for propelling the air stream, a pair of branch conduits discharging into the main conduit, valve mechanism between the branch conduits and the main conduit for determining the relative proportions of the air stream received from each branch conduit, thermostatic means responsive to temperature changes within the space for automatically adjusting the positioning of the valve mechanism, a heater in one branch conduit, a cooling means in the other branch conduit, a pair of air inlets to each branch conduit, one leading from the outer air and one from the space, and valve means for selectively closing one inlet and opening the other or vice-versa, the heater only being utilized when the outside temperature is below the desired inside space temperature at which time the last-mentioned valve means is so adjusted that air from the space is directed through the branch containing the heater whereas outside air is directed through the branch containing the non-functioning cooling means, and the cooling means only being utilized when the outside temperature is above the desired inside temperature at which time air from the space is directed through the cooling branch conduit whereas the outside air is directed through the branch containing the idle heater.

PAUL B. PARKS.